Nov. 17, 1953  A. L. SELJOS  2,659,381
PRESSURE AMPLIFYING DEVICE
Filed Aug. 17, 1951
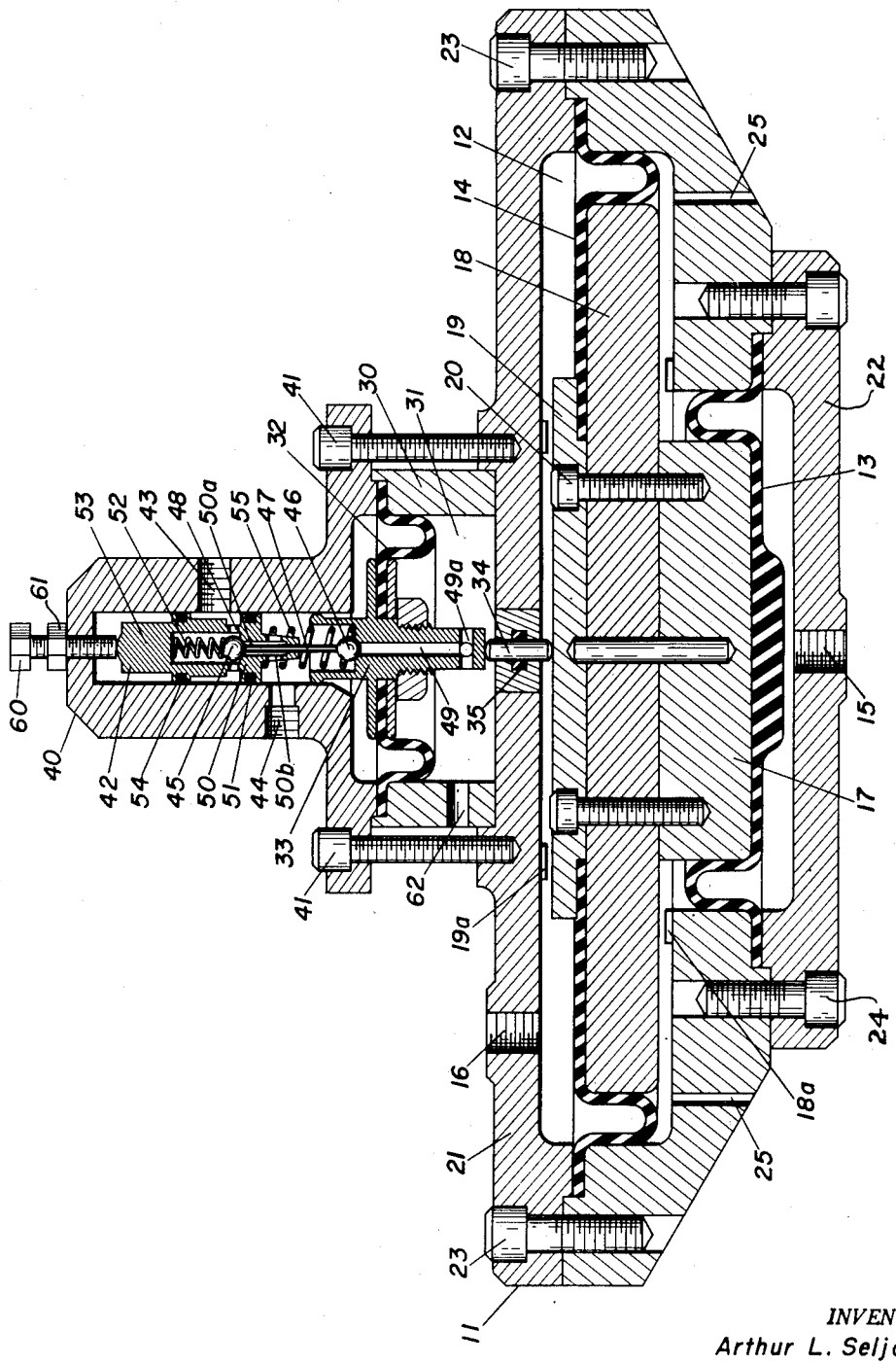
INVENTOR.
Arthur L. Seljos,
BY
*James B. McCulloch*
AGENT.

Patented Nov. 17, 1953

2,659,381

UNITED STATES PATENT OFFICE 2,659,381

PRESSURE AMPLIFYING DEVICE

Arthur L. Seljos, Houston, Tex., assignor, by mesne assignments, to Standard Oil Development Company, Elizabeth, N. J., a corporation of Delaware Application August 17, 1951, Serial No. 242,302

2 Claims. (Cl. 137—85)

The present invention is directed to a device for converting and amplifying pressure. More particularly, the invention is directed to apparatus for multiplying changes in pressure and allows adjustment of an output pressure.

The invention may be briefly described as a device for converting and amplifying pressure which comprises a first housing enclosing a first chamber in which is located opposed first and second pressure responsive means. The housing defines a first inlet to the first pressure responsive means which is adapted to be connected to a first source of pressure. The housing is provided with a second inlet to the second pressure responsive means which is adapted to be connected to a second source of pressure. A third pressure responsive means is arranged in a second chamber enclosed by a second housing mounted on the first housing. A valve means is arranged on the second housing which is adapted to be connected to a third source of pressure and to a pressure indicating means. A pressure transmitting means is arranged in the first and second chambers and operatively connects the first and second pressure responsive means with the third pressure responsive means and is adapted to open and close the valve means.

The invention will be further illustrated by reference to the drawing in which the single figure is a sectional view of a preferred embodiment thereof.

Referring now to the drawing, numeral 11 designates a housing enclosing a chamber 12 in which is arranged a first pressure responsive means 13 and a second pressure responsive means 14. The housing 11 defines a first inlet 15 which is adapted to be connected to a first source of pressure and the housing 11 defines a second inlet 16 adapted to be connected to a second source of pressure. Arranged between the pressure responsive means 13 and 14 and in contact with the pressure responsive means 13 is a first plate 17. Arranged between the pressure responsive means 13 and 14 and in contact with the first plate 17 and the pressure responsive means 14 is a second plate 18. Above the pressure responsive means 14 and in contact therewith and the second plate 18 is a third plate 19. The three plates are removably attached together by removable attaching means 20 which are shown as threaded bolts. A stop 18a on housing 11 in chamber 12 limits the downward travel of the plate 18 while a similar stop 19a above plate 19 in chamber 12 limits the upward travel of plate 19.

The housing 11 is provided with a first cover plate 21 and a second cover plate 22. Cover plate 21 is secured to the housing 11 by threaded bolts 23 while cover plate 22 is secured thereto by threaded bolts 24. The housing 11 is provided with exhaust ports 25 to vent any pressure build-up between the pressure responsive means 13 and 14.

Arranged on the housing 11 is a second housing 30 which encloses a second chamber 31. Arranged in the second chamber 31 is a third pressure responsive means 32 which is attached at its periphery to the housing 30 and is attached at its center to a valve element 33 which will be described in more detail hereinafter. The element 33 is in frictional contact with a pin 34 slidably arranged in the cover plate 21 and provided with an O-ring 35 to cause a fluid seal. The pin 34 is in contact with the plate 19 and the element 33.

Mounted on the housing 30 is a valve housing 40 which is connected to the housing 30 by threaded bolts 41. The valve housing 40 encloses a valve mechanism generally indicated at 42 which, in turn, is comprised of several parts which will be described in more detail hereinafter. The valve housing 40 is provided with an inlet 43 and an outlet 44. Inlet 43 is adapted to be connected to a source of fluid pressure while outlet 44 may be connected to a pressure indicating means.

The valve 42 comprises first and second closure members designated by numerals 45 and 46 which are interconnected by a longitudinal member 47. It will be noted that elements 45, 46 and 47 are in the form of a dumbbell. The first closure member 45 is arranged in passageway 50a between the inlet 43 and the outlet 44 while the closure member 46 is arranged in a passageway 49 in the valve element 33 which terminates in ports 49a below diaphragm 32 in chamber 31. The closure member 45 is in seating relationship with a member 50 provided with a longitudinal passageway 50a which communicates by way of ports 50b with outlet 44. An O-ring 51 is arranged on member 50. The closure member 45 is normally urged into seating relationship with member 50 by compression means or spring 52 which is held thereagainst by member 53 which carries an O-ring 54. Below the seating member 50 is a compression means 55 which bears upwardly against the member 50 and downwardly against the member 33. Arranged on the valve housing 40 is an adjusting means 60 illustrated as a threaded bolt with a threaded lock nut 61.

The threaded bolt 60 bears against the member 53.

The housing 30 is provided with an outlet port 62 which allows the underside of pressure responsive means 32 to vent to the atmosphere.

In the foregoing description taken with the drawing, the pressure responsive means 13, 14 and 32 are illustrated as diaphragms describing a U-shaped fold. Diaphragms of this nature perform satisfactorily in the apparatus of the present invention although other pressure responsive means may be substituted therefor.

The apparatus of the present invention operates as follows:

A pressure signal or impulse is exerted on diaphragm 13 through inlet port 15 which may be connected to a suitable source of pressure. An adjusting pressure is exerted on diaphragm 14 through inlet port 16 which may also be connected to a source of pressure different from and less than that exerted on diaphragm 13. A third source of pressure is exerted on the diaphragm 32 by connecting the port 43 to a third source of pressure. The pressure exerted on diaphragm 13 times the area of diaphragm 13 is at all times equal to the pressure exerted on the diaphragm 14 times the area thereof plus the pressure exerted on the diaphragm 32 times the area of diaphragm 32. Thus, by virtue of fluid leakage around the upper rim of valve element 33, the valve indicated generally as 42 admits or exhausts pressure to maintain a balanced pressure on the diaphragm 32. In a typical operation, the pressure on diaphragm 14 is set so the pressure on diaphragm 32 is at a mean delivery pressure when the signal pressure exerted on diaphragm 13 is at a desired point. A decrease in signal pressure would thus exhaust the pressure from the valve to a point where the device would still be in balance, the change being in proportion to the areas of the diaphragm 13 and the diaphragm 32. An increase in the signal pressure would cause the valve 42 to admit pressure until the device is again in balance changing the output pressure in proportion to the areas of diaphragms 13 and 32. By allowing a constant small leak in the output pressure from the valve, the valve is always delivering and hence always at the same position which reduces displacement when the pressures are balanced. For example, assuming pressure is exerted on diaphragm 13 and an adjusting pressure is exerted on a diaphragm 14, the net effect would be the movement upwardly of plates 17, 18 and 19. This would cause the pin 34 to move upwardly by virtue of plate 19 contacting it, which, in turn, would raise the valve element 33. The movement upwardly of the valve element 33 would cause the dumbbell arrangement including elements 45, 46 and 47 to move also in an upwardly direction unseating the element 45 from the seating member 50 allowing passage of fluid pressure from the port 43 through passageways 48 and then through passageway 50a and ports 50b to outlet 44 and to diaphragm 32. When the pressure on diaphragm 13 and diaphragm 14 is such that the plates 17, 18 and 19 move downwardly the pin 34 is also free to move in a downward direction. The pressure introduced by port 43 exerted on diaphragm 32 causes the diaphragm to flex downwardly pulling the valve element 33 downwardly and unseating the closure member 46 and allowing the passage of fluid or air through the passageway 49 and ports 49a to the chamber 31 and to the atmosphere through port 62. The distance of travel of plates 18 and 19 between stops 18a and 19a may be suitably adjusted by adjustment of adjusting means 60 and collar 61 which restricts upward movement against the member 33.

In employing the device of the present invention the three diaphragms may be chosen to give any multiplication which is desired. For example, the ratio of the area of the diaphragms 13 and 32 may be 4:1 so that 1 lb. per sq. in. pressure exerted against the diaphragm 13 gives 4 lbs. per sq. in. change in the output pressure delivered from the valve 42. Likewise, the area of diaphragm 14 may be 5 times that of diaphragm 13 so that 100 lbs. sq. in. pressure exerted against diaphragm 14 will balance 500 lbs. pressure exerted against diaphragm 13.

From the foregoing description of the present invention and the operation thereof it is seen that a device has been described which multiplies changes in pressure and allows adjustment of an output pressure from a valve means.

The present invention is particularly useful in an automatic drilling control where a pressure signal from a weight indicator is employed to work against a diaphragm and the like. While my invention is particularly useful in weight indicator systems, it is to be understood that it may be used anywhere where multiplication of changes in pressure is required.

The nature and objects of the present invention having been completely described and illustrated, what I wish to claim as new and useful and to secure by Letters Patent is:

1. A device for converting pressure which comprises, in combination, a first housing enclosing a first chamber, opposed first and second diaphragms arranged in said first chamber, means connecting said first and second diaphragms, said first housing defining a first inlet to the first diaphragm adapted to be connected to a first source of fluid pressure and a second inlet to the second diaphragm adapted to be connected to a second source of fluid pressure, a second housing mounted on said first housing enclosing a second chamber, a third diaphragm arranged in said second chamber, a valve housing mounted on said second housing having first and second ports adapted to be connected, respectively, to a third source of pressure and to a pressure indicating means, a valve means arranged in said valve housing operatively connected to said third diaphragm including first and second spaced apart interconnected closure means, first and second seating means for said closure means, a first passageway in said valve means providing, when open, communication between said ports, a second passageway in said valve means providing communication when open between said second port and a space in said second chamber below said third diaphragm and with the atmosphere, a first biasing means normally urging said first closure means against said first seating means, second biasing means normally urging said first seating means against said first closure means, and pressure transmitting means slidably arranged in a wall between said second housing and said first housing operatively connected to said third diaphragm and said valve means and arranged to transmit relative movement between said first and second diaphragms and said third diaphragm and to said valve means to open and close said passageways in said valve means.

2. A device for converting pressure which comprises, in combination, a first housing enclosing a first chamber, opposed first and second diaphragms arranged in said first chamber, a first plate arranged between the first and second diaphragms in contact with the first diaphragm, a second plate arranged between the first and second diaphragms in contact with the first plate and the second diaphragm, a third plate arranged above the second diaphragm in contact therewith, said first, second, and third plates being removably attached to each other, said first housing defining a first inlet to the first diaphragm adapted to be connected to a first source of fluid pressure and a second inlet to the second diaphragm adapted to be connected to a second source of fluid pressure, a second housing enclosing a second chamber and mounted on said first housing, a third diaphragm arranged in said second chamber, a valve housing mounted on said second housing having first and second ports adapted to be connected, respectively, to a third source of pressure and to a pressure indicating means, a valve means arranged in said valve housing operatively connected to said third diaphragm including first and second spaced apart interconnected closure means, first and second seating means for said closure means, a first passageway in said valve means providing communication when open between said ports, a second passageway in said valve means providing communication when open between said second port and a space in said second chamber below said third diaphragm and with the atmosphere, a first biasing means normally urging said first closure means against said first seating means, second biasing means normally urging said first seating means against said first closure means, and a pin slidably arranged in a wall between said second housing and said first housing in frictional contact with said third plate and said valve means adapted to transmit relative movement between said first and second diaphragms and said third diaphragm to open and close said passageways in said valve means.

ARTHUR L. SELJOS.

References Cited in the file of this patent

UNITED STATES PATENTS

| Number | Name | Date |
|---|---|---|
| 2,304,782 | Donaldson | Dec. 15, 1942 |
| 2,308,923 | Hartley | Jan. 19, 1943 |
| 2,436,451 | Rosenberger | Feb. 24, 1948 |
| 2,461,026 | Bilyeu | Feb. 8, 1949 |
| 2,529,883 | Otto | Nov. 14, 1950 |
| 2,584,455 | Hughes | Feb. 5, 1952 |
| 2,593,906 | Markson | Apr. 22, 1952 |